United States Patent
Stieg

[15] 3,681,904
[45] Aug. 8, 1972

[54] ROTATING TURNING BAR WITH REMOTE POSITION CONTROL

[72] Inventor: Bernard O. Stieg, Neenah, Wis.
[73] Assignee: Kimberly-Clark Corporation, Neenah, Wis.
[22] Filed: Feb. 8, 1971
[21] Appl. No.: 113,233

[52] U.S. Cl. ..................57/3, 156/195, 156/425
[51] Int. Cl. ..................B65h 81/04, B31c 9/00
[58] Field of Search..........57/3, 6, 7, 10, 11, 19, 160; 156/195, 425, 429, 439, 190

[56] References Cited

UNITED STATES PATENTS

| | | | |
|---|---|---|---|
| 1,544,546 | 7/1925 | Baker | 156/425 |
| 3,000,167 | 9/1961 | Pierce, Jr. | 57/3 |
| 3,284,995 | 11/1966 | Haight | 57/3 |
| 3,453,163 | 7/1969 | Mills et al. | 156/195 X |
| 3,486,317 | 12/1969 | Grawey et al. | 57/3 |
| 3,492,185 | 1/1970 | Burger | 156/425 |
| 3,616,007 | 10/1971 | Anderson | 156/190 |

Primary Examiner—John Petrakes
Attorney—Wolfe, Hubbard, Leydig, Voit & Osann, Ltd.

[57] ABSTRACT

An improved guide means for use in an apparatus for making a multi-ply cross-laid material. The apparatus includes one or more satellite rolls of web material carried by a rotatable carrier disposed about a mandrel on which a continuous carrier belt is helically wound. A web from the satellite rolls is cross-laid on the belt and a subsequent web is then applied to the cross-laid web in advance of a slitter which slits the cross-laid web to yield the multi-ply material.

The guide means includes an initially angularly adjustable turning bar that is also remotely adjustable so that the turning bar is movable in a linear direction while maintaining the initial angular position. The guide means also includes an idler roller around which the web passes prior to reaching the turning bar to maintain the angle of the web approaching the turning bar constant regardless of the amount of web present on the satellite roll.

10 Claims, 7 Drawing Figures

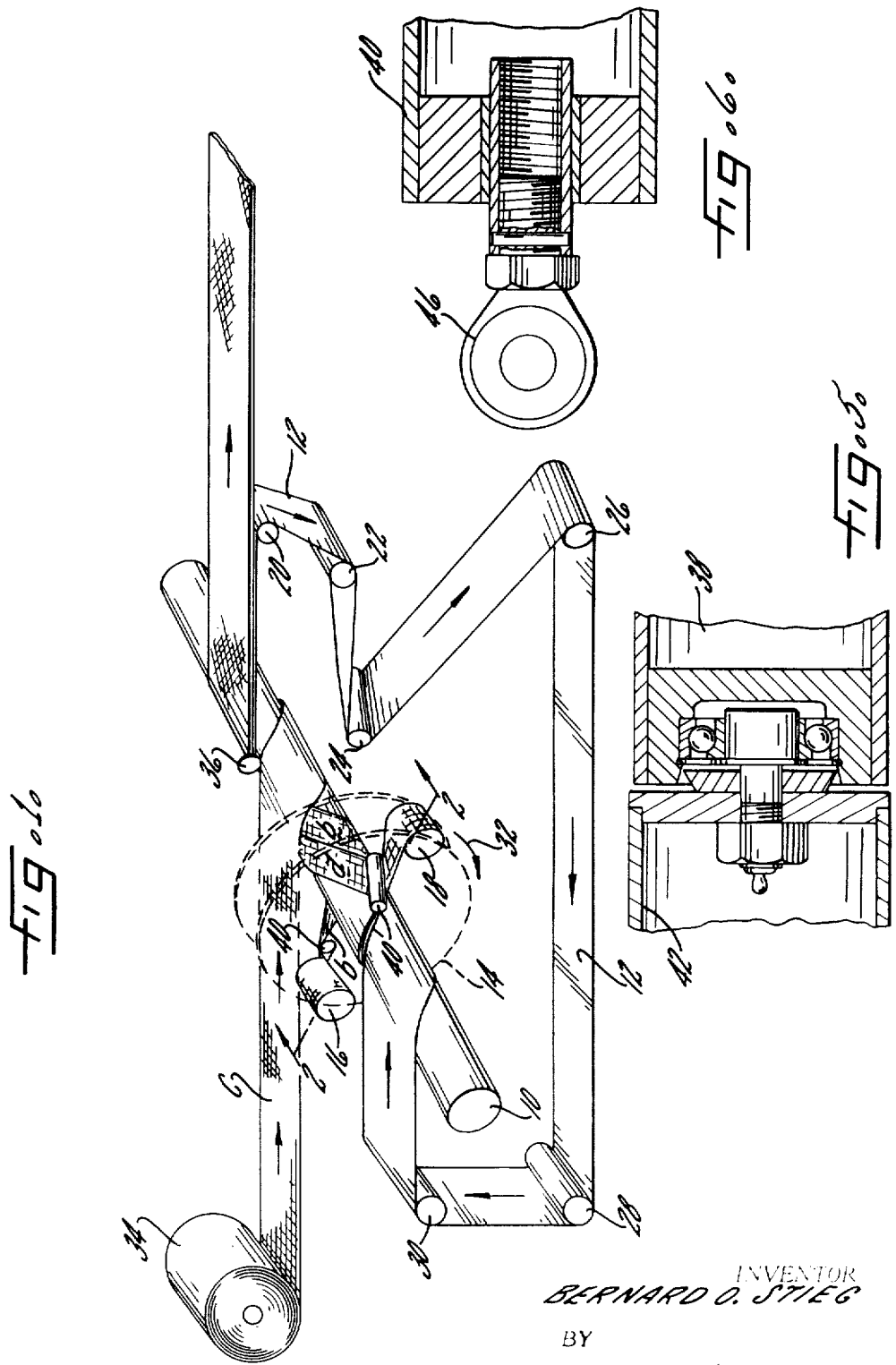

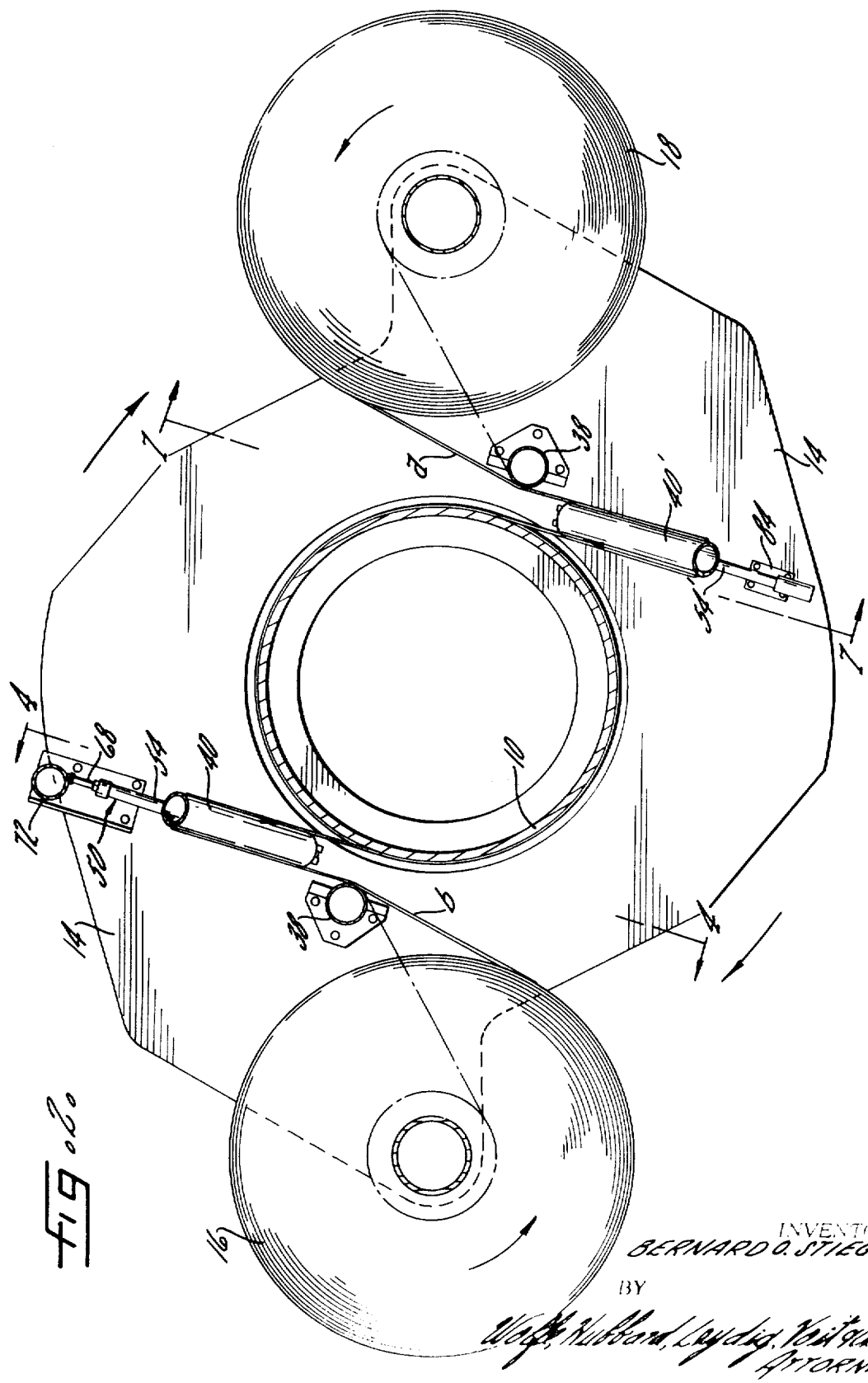

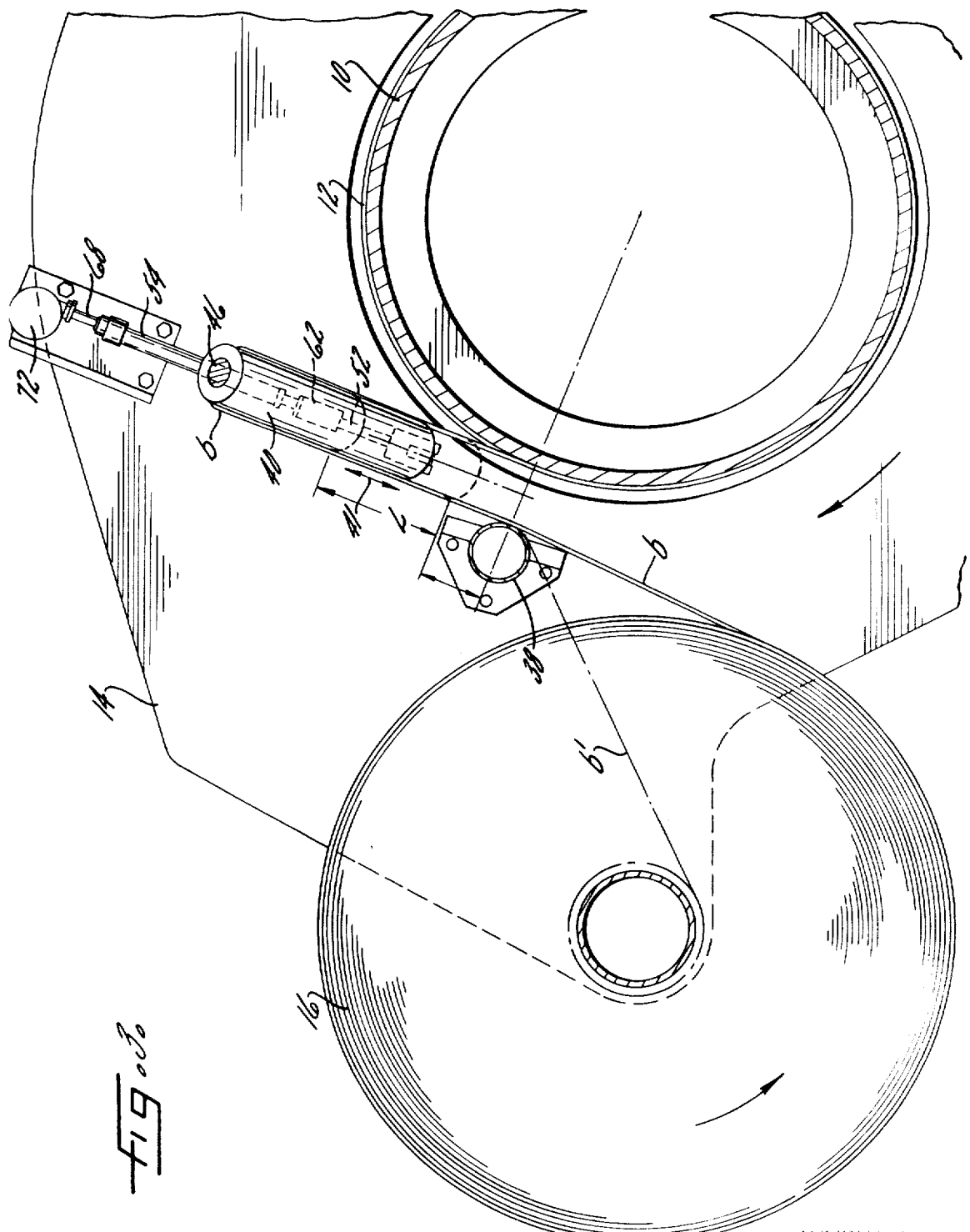

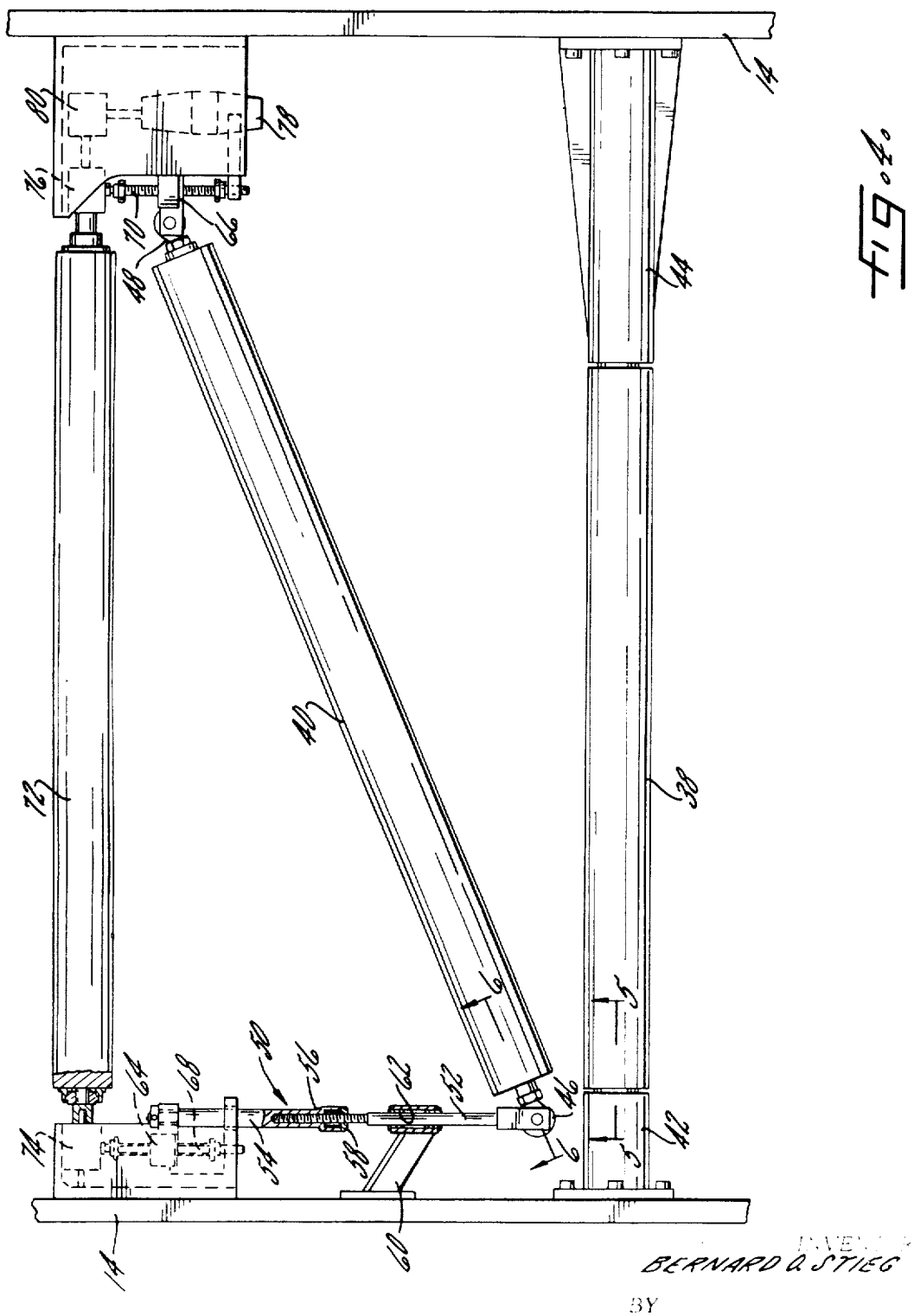

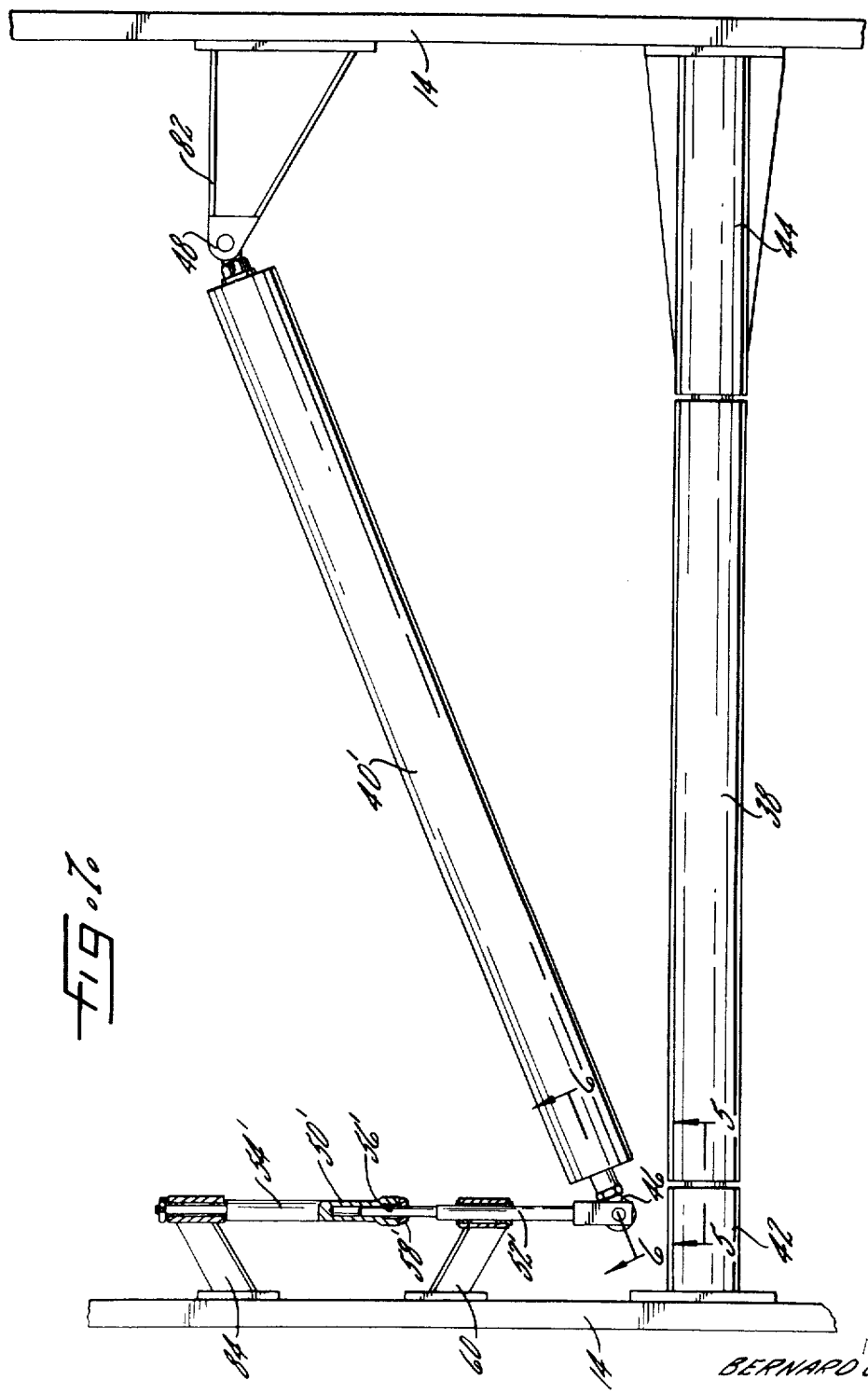

ROTATING TURNING BAR WITH REMOTE POSITION CONTROL

BACKGROUND OF THE INVENTION

The present invention relates generally to cross-laying apparatus for forming a multi-ply web in which the long dimension of at least one web extends transversely across the other web and, more particularly, concerns an improved guide means for positioning the one or more transversely oriented webs during manufacture of the product.

It has previously been proposed, for example in Hirschy U.S. Pat. No. 2,841,202, Burger Pat. No. 3,492,185, and in an application of Dean K. Anderson, Ser. No. 803,245, filed Feb. 28, 1969, now U.S. Pat. No. 3,616,007, to provide a multi-ply web producing apparatus of the general type in which a belt is helically traveled around a mandrel, with a carrier for one or more satellite rolls of web material being disposed to rotate about the mandrel. The mandrel preferably is provided with openings through it, and air under pressure is supplied to its interior for floating the belt on the mandrel.

In accordance with the method and apparatus disclosed in the Anderson application, the carrier, being rotatable about the mandrel and journaling a pair of satellite rolls of web material, helically wraps the web material around the mandrel and onto the belt as the belt moves around one of the turns on the mandrel, with the web material being applied to the belt as a substantial angle relative to the longitudinal dimension of the belt. A second web of material is introduced in registry with the belt as it moves around a subsequent helical turn on the mandrel to imprison the first webs between the belt and the second web. A slitter disposed along the edge of the belt then cuts the imprisoned first webs into transverse web segments and the composite web is carried off the mandrel by and is subsequently separated from the belt.

To achieve greater strength of the web product, the transversely extending webs applied to the belt from the satellite rolls are slightly overlapped during their application. It is seen that if the edges of the adjacent webs were only in an abutting relationship, the product would have the strength of one ply at the seam. It is also more convenient to have the axis of the satellite roll mounted on the carrier parallel to the axis of the mandrel and accordingly there must be a mechanism on the carrier to turn the web so that it is fed onto the belt at the proper angle.

In the Burger U.S. Pat. No. 3,492,185, the web is played off of the satellite rolls and is immediately passed over the turning bar to approach the mandrel at the proper angle relative to the belt, so that the webs are laid, for example, approximately perpendicular to the moving belt. If both satellite rolls are the same size, the webs will approach their respective turning bars at the same angle, with the angles changing as the rolls are depleted. Because the changing approach angle to the turning bars affects the angle of the web approaching the belt, the overlapping portions of the transverse web segments remain uniform over the width of the belt, but the angle of lag of the material may change from 89° to 91° for example, as the rolls are depleted.

The Burger turning bar is also adjustable to vary the amount of overlap of the transverse web segments. However, the turning bar is mounted on an adjustable parallelogram linkage which inherently does not result in true linear movement. Therefore, adjustment of one of the turning bars to vary the amount of overlap will also slightly change the angle of one of the webs approaching the belt while the other web is not changed, resulting is a slightly skewed overlap, being nonuniform across the width of the belt. This is undesirable and may ultimately cause wrinkling of the product.

Accordingly, it is a primary object of the present invention to provide a guide means that will turn a web from a satellite roll so that it approaches the belt on the mandrel at a constant predetermined angle regardless of the amount of the web material existing on the satellite rolls.

Another object of the present invention is to provide a guide means that is adjustable to vary the amount of overlap between adjacent transverse web segments, while maintaining a substantially constant approach angle of the satellite web being applied to the belt on the mandrel.

A further object of the present invention is to provide a guide means having a turning bar that may be remotely controlled to adjust the amount of overlap between adjacent transverse web segments while the carrier is rotating around the mandrel during production.

Still another object is to provide a guide means that is initially adjustable to vary the approach angles of the satellite webs being applied to the belt and is also remotely adjustable to change the amount of overlap of the satellite webs while maintaining their angles of approach to the belt substantially constant.

Other objects and advantages will become apparent by reading the following detailed description and upon reference to the attached drawings, in which:

FIG. 1 is a schematic view of a cross-laying apparatus, including the guide means which is the subject of the present invention;

FIG. 2 is an end view of the cross-laying apparatus schematically illustrated in FIG. 1, showing the improved guide means mounted on the rotatable carrier;

FIG. 3 is an end view, with parts removed, illustrating the movable portion of the guide means and their relation to the satellite roll and the mandrel;

FIG. 4 is a view, partially in section, illustrating the movable portion of the guide means associated with the carried and taken along the lines 4—4 of FIG. 2;

FIGS. 5 and 6 are sectional views of portions of the apparatus, taken along the lines 5—5 and 6—6, respectively, of FIG. 4; and FIG. 7 is a plan view, partially in section, illustrating the nonmovable portion of the guide means associated with the carrier; and taken along the lines 7—7 of FIG. 2.

DESCRIPTION OF THE PREFERRED EMBODIMENT

Referring now to the cross-laying apparatus illustrated in FIGS. 1 and 2, there is shown a generally cylindrical mandrel 10 around which an endless belt 12 is helically wound through a plurality of turns. A spider or carrier 14 is rotatably disposed about the mandrel 10 and carries a pair of satellite rolls 16 and 18 of elongated web material. The mandrel 10 is preferably in the form of a hollow cylindrical shell having a plurality of air discharge openings therein, with the interior of the mandrel being supplied with air under pressure to floatingly support the belt 72 on the surface of the mandrel. The belt 12 moves around roller 20 and 22, one of which may be a drive roller, to turning bars 24 and 26 and onto rollers 28 and 30. determines the approach angle of the belt 12 to the mandrel and thus the angle of the helical turns.

The carrier 14 is rotated about the mandrel 10 in the direction of the arrow 32 and in timed relation to the helical movement of the belt 12 on the mandrel. As the carrier 12 rotates, webs a and b of the elongated web material from supply rolls 16 and 18, respectively, are helically wound about the mandrel and onto the surface of the belt 12. The width of the satellite rolls 16 and 18 and of the webs a and b and the other parameters of the system are such that the complete outer surface of the belt 12 is covered by the webs a and b; and the webs a and b overlap slightly and have their longitudinal dimension extending at an angle, such as 90°, with respect to the longitudinal dimension of the belt 12. In other words, the webs a and b are helically wound, in a generally shingled fashion, substantially transverse to the belt 12.

Following the helical wrapping of webs a and b on the belt, another web c is drawn from supply roll 34 and is wound about the mandrel in a subsequent helical turn in registry with he belt 12. The web c thus overlies the surface of webs a and b and imprisons webs a and b between the web c and the belt 12. The web c preferably makes at least one complete helical turn on the mandrel and a slitter 36 is disposed to cut the webs a and b into transverse segments along the edges of the web c and the web 12. Following the slitting operation, the belt 12 and composite web a–c move off the mandrel 12 in the direction of the roller 20. The composite web a–c is then separated from the belt 12 and may be suitably processed and wound into a roll or the like, as desired.

For various reasons, such as the replacement of the satellite rolls as well as the reduction in size of the carrier 14, it is advantageous to mount the axis of the satellite rolls 16 and 18 substantially parallel with the axis of the mandrel 10. The parallel mounting of the satellite rolls then requires a guide means to turn the webs being drawn off the rolls to approach the belt 12 on the mandrel at the proper angle of approach.

In accordance with the present invention, the improved guide means includes a combination of an idler roller and a turning bar in conjunction with the satellite roll. The idler roller maintains a substantially constant angle approach of the web approaching the turning bar, regardless of the amount of web on the satellite roll. The idler roller and turning bar are also positioned so that the planes of the webs approaching and leaving the turning bar are substantially parallel, thereby enabling the turning bar to be adjustable toward and away from the mandrel so that the point of contact of the web on the belt may be shifted along the mandrel axis while maintaining a substantially constant approach angle. Additionally, the turning bar is initially angularly positionable as well as being linearly remotely adjustable.

Referring to the simplified end view of FIG. 3, the mandrel 10 is shown with one of the satellite rolls 16 mounted on a portion of the carrier 14. The guide means include an idler roller 38 and a turning bar 40. The axis of the idler roller 38 is parallel to the axes of the satellite roll 16 as well as the mandrel, while the axis of the turning bar 40 is parallel to the axis of the idler roller only when viewed from directly above or below the turning bar as illustrated by the arrows 41 in FIG. 3. The turning bar 40 is angularly disposed when viewed from the side, so that the web a is turned to approach the belt 12 on the mandrel 10 at the correct predetermined angle as is generally shown in the schematic view of FIG. 1.

The web a being drawn off the substantially full satellite roll 16 shown in FIG. 3, passes over the idler roller 38 and is slightly turned or deflected to approach the turning bar 40. As shown in phantom, when the satellite roll 16 is almost expended, the web a is deflected a substantially greater angle as it passes around the idler roller 38, but the web approaches the turning bar 40 at the same angle as occurred when the roll 16 was substantially full. Thus, unlike the apparatus in the above named Burger patent, the size of the satellite roll of web product has no effect upon the angle of approach of the web being applied to the belt 12. As is clearly shown, the web approaching the turning bar 40, as well as the web leaving the turning bar and approaching the belt 12 on the mandrel each define planes that are substantially parallel.

To achieve parallelism of these web planes, it is necessary that the diameter of the turning bar 40 be substantially equal to the distance between the surfaces of the idler roller 38 and the belt 12 at their closet point.

As was previously mentioned, the guide means is adjustable to vary the amount of overlap between webs a and b in the final composite web a–c. To achieve this variable overlap, the turning bar 40 is linearly movable in a direction parallel to the web planes approaching and departing the turning bar 40. This permits changing of the length L, which in turn changes the point of contact of the web a upon the moving belt 12 relative to the placement of the web b on the belt. However, because the angular position of the turning bar 40 is not changed, the approach angle of a web a remains substantially constant so that although the amount of overlap is changed, the overlapping remains substantially uniform across the width of the belt 12.

In accordance with another aspect of the present invention, and referring to FIG. 4, the detailed structure of the variable portion of the guide means will now be described. The stationary idler roller 38 is rotatably journaled in mounting brackets 42 and 44 which are suitably secured to the carrier 14 by conventional means.

To movably support the turning bar 40, the opposite ends thereof have eyebolts 46 and 48 through which pins or the like may be placed for attachment. Eyebolt 46 is secured to an elongated arm indicated generally at 50. To vary the effective length of the arm 50, it may be comprised of two sections 52 and 54 having threaded portions in cooperative engagement shown at 56, with the section 54 being rotatable relative to the nonrotatably section 52 enabling minor changing of the effective length of the arm 50 and therefore the angular position of the turning bar 40. To preclude changing of the length of the arm 50 during operation, a locknut 58 is also provided. The adjustment of the length of the arm 50 must be manually performed while the carrier is not rotating, and in practice the adjustment is similar to a vernier adjustment, permitting a change of approximately 2° of the angle of the turning bar 40. To adequately support the elongated arm 50, a guide bracket 60 preferably having an oil impregnated bushing 62 slidably supports the arm 50.

To provide linear movement of the turning bar relative to the idler roller as was previously stated, the section 54 of the arm 50 as well as the eyebolt 48 each have a traveling nut 64 and 66 connected thereto. The traveling nuts 64 and 66 threadably engage rotatable elongated Acme threaded screws 68 and 70, or the like, which are mechanically coupled together. A rotatable shaft 72 is connected to the screw 68 through a right angle gear train 74 as well as to the screw 70 through gear train 76.

To drive the rotatable screws 68 and 70, a reversible motor 78 is connected to the gear train 76 through a right hand gear train 80. A suitable controlling mechanism (not shown) enables an operator to remotely engage the motor 78 which rotates the screws 68 and 70 by means of the gear trains, so that the turning bar 40 is moved towards or away from the idler roller while maintaining a substantially constant angular position.

Referring to FIG. 7, the nonmovable turning bar 40 which is disposed approximately 180° from the turning bar 40 is illustrated. Because the turning bar 40 is not movable relative to the idler roller 38', the eyebolt 48' is connected to a bracket 82 which is secured to a carrier 14 by suitable bolts, or the like. Similarly, the elongated arm 50' has section 54' rotatably secured to bracket 84 which is also secured to the carrier 14 by suitable bolts, or the like. The arm 50' is also comprised to two sections 52' and 54' that are threadably connected so that adjustment of the effective length of the arm 50' is possible, thereby enabling angular adjustment of the turning bar 40' of approximately 2°.

The present invention substantially eliminates the unevenness of the amount of overlap between the webs a and b and therefore correspondingly reduces the amount of operator attention required in monitoring the apparatus. Additionally, since the angle of the web approaching the mandrel remains substantially constant regardless of the amount of web on the satellite rolls, better quality control of the final product is achieved, with a corresponding decrease in waste.

I claim as my invention:

1. In an apparatus for forming a multiple web product, the apparatus having a cylindrical mandrel, a carrier rotatable about the mandrel and journaling a supply roll of an elongated web material, with the axis of the supply roll being substantially parallel to the mandrel axis, an improved guide means adapted to turn the web material such that the web material may be helically wound around the mandrel, the guide means including:

an adjustable turning bar means angularly positioned in a plane tangent to the outer surface of the mandrel, the bar means being positioned to turn the web material to approach the mandrel at a predetermined angle, the plane of the web material approaching the mandrel being substantially tangent to the outer surface of the mandrel at a point where the web material is wound around the mandrel; and an idler roller means interposed between the supply roll and the turning bar means, the idler roller means having its axis substantially parallel to the mandrel axis, with the idler roller means being adapted to position the web material such that the plane of the web material approaching the turning bar means is substantially constant regardless of the amount of web material on the supply roll.

2. The apparatus of claim 1 further characterized in that the turning bar means includes adjusting means for moving the turning bar means toward and away from the mandrel in the plane tangent to the outer surface of the mandrel in order to shift the point where the web material is would around the mandrel without changing said predetermined angle of approach of the web material to the mandrel.

3. The apparatus of claim 1 further characterized in that the turning bar means includes adjusting means for changing the angularity of the turning bar means in the plane tangent to the outer surface of the mandrel in order to change said predetermined angle of approach of the web material to the mandrel.

4. The apparatus of claim 1 further characterized in that the idler roller is spaced from the surface of the mandrel a distance approximately equal to the diameter of the turning bar means, whereby the plane of the web material approaching the turning bar means is substantially parallel to the plane of the web material leaving the turning bar means.

5. The apparatus of claim 4 further characterized in that the turning bar means includes an adjustment means being operable to vary the distance between the turning bar means and the mandrel such that the angular position of the turning bar means remains substantially constant and the planes of the web material approaching and leaving the turning bar means remain substantially constant.

6. The apparatus of claim 4 further characterized in that the adjustment means includes:

first and second support means associated with opposite ends of the turning bar means, the support means each having a threaded traveling nut means associated therewith, each of the nut means operably engaging a rotatable threaded screw means, with the screw means being positively coupled such that the rotation of one of the screw means correspondingly rotates the other screw means to thereby move each of the nut means whereby each of the support means and the turning bar is movable in the longitudinal direction of the screw means; and a drive means operable to rotate the threaded screw means.

7. The apparatus of claim 6 further characterized in that one of the support means includes an elongated arm connected to one end portion of the turning bar means and one of the threaded traveling nut means, with the elongated arm being slidably supported by a guide means associated with the carrier, the arm being adjustable to vary its effective length, thereby to variably adjust the angular position of the turning bar means.

8. The apparatus of claim 7 further characterized in that the arm means includes:
- two sections having threaded portions in cooperative engagement, such that rotation of one section relative to the other varies the length of the arm; and
- a locking means to prohibit rotation of one of the sections relative to the other.

9. The apparatus of claim 6 further characterized in that the drive means includes a motor associated with the carrier, with the motor being coupled with one of the screw means, the motor being reversible to reversibly rotate the screw means whereby the turning bar means is movable in opposite directions relative to the idler bar means.

10. The apparatus of claim 1 further characterized in that the carrier journals a pair of supply rolls of elongated web material and the guide means includes an adjustable turning bar means and an idler roller means for each web of material, with both of said turning bar means including adjusting means for changing the angularity of the turning bar means in the plane tangent to the outer surface of the mandrel in order to change said predetermined angle of approach of the web material to the mandrel, and at least one of said turning bar means including further adjusting means for moving the turning bar means toward and away from the mandrel in the plane tangent to the outer surface of the mandrel in order to shift the point where the web material is wound around the mandrel without changing said predetermined angle of approach of the web material to the mandrel.

* * * * *